UNITED STATES PATENT OFFICE 2,528,559

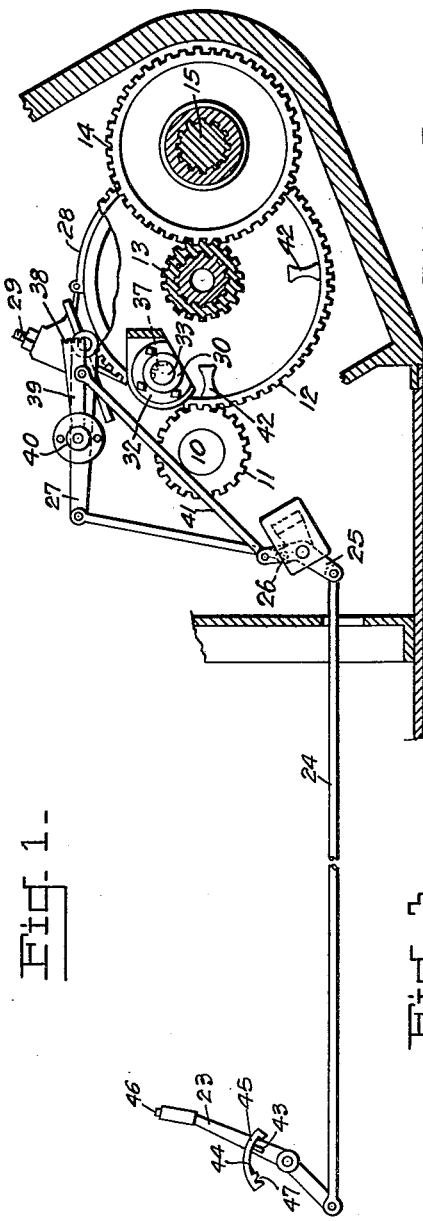
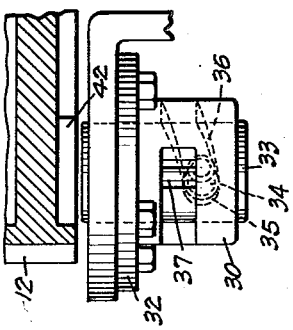
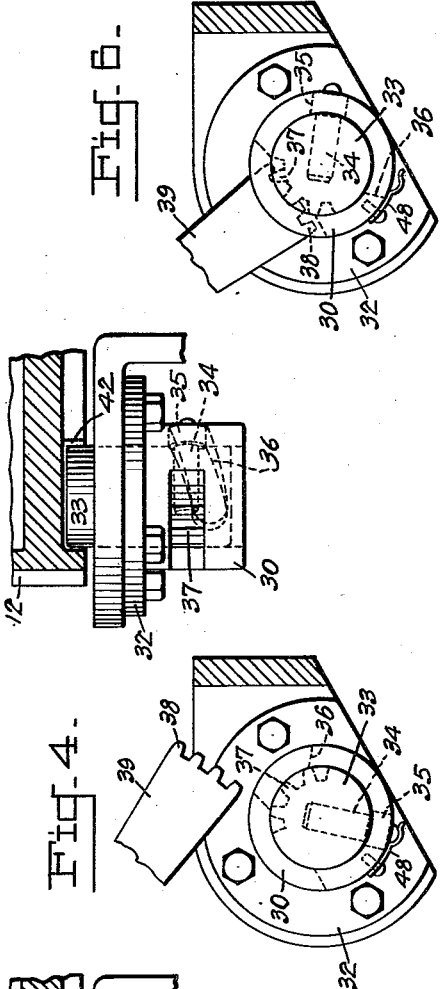

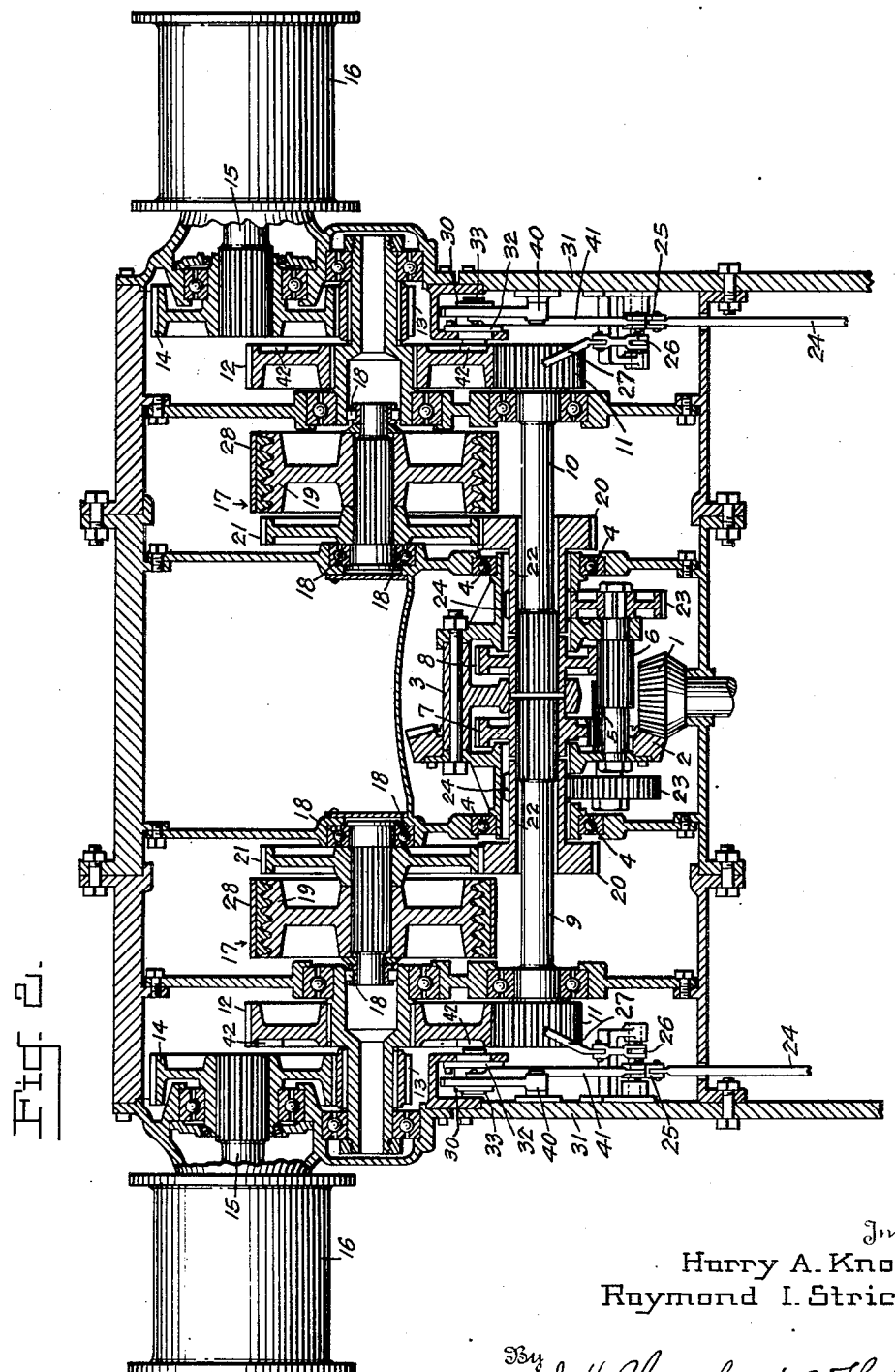

BRAKE CONTROLLED DIFFERENTIAL FOR SKID STEERING OF VEHICLES

Raymond I. Strickland, Greenbelt, Md., and Harry A. Knox, Washington, D. C.

Application August 26, 1947, Serial No. 770,700

4 Claims. (Cl. 74—710.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a control device for the steering of vehicles, particularly tracklaying vehicles, and is concerned with a means providing a minimum turning radius.

In the use of tracklayers for military purposes, a small turning radius is a desideratum, for in negotiating in limited channels, the necessary maneuvering to and fro incident to prior art tracklayers arose from the limited steering ratio imposed by a system such as a steering brake and controlled differential whereby no one side of the vehicle was ever completely stopped.

In the present invention such complete stoppage is accomplished by mechanism which is an addendum to the known system of steering brake and differential.

It is, therefore, an object of the invention to provide a means for "skid steering" of vehicles, further objects being to provide means for complete stoppage of either side of a tracklaying, differential-equipped tracklayer, and to accomplish the same in a facile manner with a minimum number of parts adapted for ready inclusion in existing vehicles and with simple and ready manual control.

To these and other ends, reference is had to the accompanying specification and claims, and to the drawings, in which like reference characters represent like parts throughout, and in which:

Fig. 1 is a side view of the controls,

Fig. 2 is a view at right angles to Fig. 1 showing the differential and steering brake, and Figs. 3 to 6 are details of the skid steering control.

The controlled differential is well known, and comprises an input bevel pinion gear 1, leading from the transmission, engaging a bevel gear 2 which carries a cage designated generally at 3 rotating on bearings 4. The cage carries differential pinions which mesh in pairs, such as 5 and 6, with each other and with compensating gears 7 and 8 respectively, the latter being splined to their separate compensating drive shafts 9 and 10. The main power output is through shafts 9 and 10, the latter leading through gears 11, 12, 13 and 14 to the final drive shaft 15 and track hub 16.

A steering brake 17 is mounted in bearings 18 for rotation independent of the final drive gears. The inner portion 19 of the brake has rotating connection through gears 20, 21 with compensating shaft 22 geared to differential pinion 6 through gear elements 23 and 24.

The foregoing conventional arrangement operates as follows: Differential pinions 5 and 6, being interlocked, will resist rotation in their bearings in the cage 3, and hence will rotate compensating driveshaft 9, and through gears 23, 24, inner brake portion 19. Application of brake 17 results in rotation of differential pinion 6 in its bearings which has the effect of slowing up compensating gear 8 and a diversion of power to compensating gear 7 through the rotation of differential pinion 5.

The insufficiency of the foregoing arrangement resides in the fact that compensating gear 8 is never completely stopped.

In order to provide stoppage for the power output in the system 9 through 16 means are provided for positively stopping rotation of the gear 12 when desired.

The conventional controls for the steering brake are traced from hand lever 23 through rod 24, bell crank 25, levers 26, 27, and brake band 28 having an adjustment at 29.

A sleeve 30 is affixed to the differential housing 31 by bolts through its flange 32. Movably held in the sleeve 30 is a bolt or stop member 33 carrying a radially inserted pin 34 having a follower head 35 which rides a cam groove 36 in the sleeve 30.

A toothed sector 37 formed on stop member 33 is engageable by teeth 38 on a lever or gear sector 39 articulated to the differential housing at 40. Medially of the sector 39 is pivoted one end of a rod 41, the other end of which is pivoted on bell crank 25.

Stop lugs 42, (four in number in the example shown) are provided on the intermediate gear 12, positioned for intercepting the stop 33 when the latter is moved axially inward.

When the right and left steering levers are in the forwardmost position as shown for the single lever illustrated in Figure 1, both brakes 17 are released. To apply a brake, the corresponding lever 23 is pulled back. When detent or plunger 43 abuts a stop lug 44 on brake sector 45, the corresponding brake 17 has been applied to the maximum extent possible and the vehicle is then set for turning in a corresponding direction at the maximum rate possible without our invention. At this time, the sector 39 has been turned by the aforesaid retraction of the brake lever, to the position of Figure 4 wherein its teeth 38 are just clear of the teeth of sector 37. Now, should a still higher rate of turning be desired, the operator presses thumb button or catch 46 to thereby move detent 43 out of engagement with lug 44. The lever may now be pulled back to its maximum retracted postion past lug 44. This position is determined by engagement of detent 43 with lug or stop 47 fixed to brake sector 45. This final movement pivots sector 39 until its teeth mesh with teeth 37 and rotate stop member 33. This rotation effects a corresponding axial translation of the stop member, due to the coaction of head 35 of pin 34 and helical groove 36, to the position of Figure 5 wherein the member is in the path of lugs 42. As a result, further movement of the track on that side is prevented and the vehicle is adjusted for turning at a maximum rate higher than was previously possible. The actual rate will, of course, depend upon the transmission gear adjustment and the speed of the engine.

A leaf spring stop means for holding stop 33 in withdrawn position is shown at 48.

Having thus described our invention, what we claim as new and desire to secure by Letters Patent is:

1. In a track-laying vehicle, a differential, twin output gearing drives from respective sides of said differential, lugs on corresponding elements of each of said drives between said differential and the final drive to the tracks of said vehicle, a pair of sleeves fixed on the vehicle, there being a helical groove in each sleeve, a bolt rotatably and slidably mounted in each sleeve, a pin secured in each bolt and projecting therefrom into the radial slot in its corresponding sleeve, a toothed sector on each bolt, a pair of gear sectors pivoted on said vehicle, each sector having teeth for engagement with the toothed sector of a respective bolt, and manually operable means to selectively pivot either of said gear sectors to thereby rotate and axially translate the corresponding bolt into the path of the lugs of a respective element to thereby positively stop rotation of said element.

2. In a steering mechanism for a track-laying vehicle, a differential including a sun gear and first and second intermeshing planetary gears, a power drive from each said planetary gear to a respective track, each drive including a rotatable element having stop lugs, a sleeve fixed adjacent each said element, a bolt axially translatable in each sleeve into the path of the lugs of a respective element, first and second brake drums, each connected for positive rotation from a respective power drive, a brake band in braking relation with each said drum, a pair of pivoted manually operable levers, means responsive to rotation of each lever in one direction from a neutral position to engage a respective brake band with its drum, and means responsive to rotation of each lever in an opposite direction from said neutral position to axially translate a corresponding bolt into the path of the lugs of a respective element to thereby positively stop motion of the corresponding track.

3. In a vehicle having twin output gearing including a differential, interrupting means on the vehicle comprising an axially movable bolt mounted for motion into the path of an element of said output gearing to completely stop rotation of the same, whereby all power applied to said differential is transmitted to the other side of the vehicle through the differential, and means to move said bolt to rotation-stopping position, said bolt-moving means comprising a fixed sleeve within which said bolt is rotatable and axially slidable, there being a helical slot in said sleeve, and a pin in the bolt having a follower engaged in the slot, and means to rotate said bolt to effect axial movement thereof.

4. The device recited in claim 3, the means to rotate said bolt comprising a toothed sector on the bolt and a sector on the vehicle having teeth engageable with the toothed sector on the bolt.

RAYMOND I. STRICKLAND.
HARRY A. KNOX.

REFERENCES CITED

The following references are of record in the file of this patent:

UNITED STATES PATENTS

| Number | Name | Date |
| --- | --- | --- |
| 1,427,612 | Marcy | Aug. 29, 1922 |
| 1,758,216 | Brey | May 13, 1930 |
| 1,872,541 | White | Aug. 16, 1932 |